United States Patent [19]

Kitchen et al.

[11] 4,195,377

[45] Apr. 1, 1980

[54] LEG ASSEMBLY FOR A BED FRAME

[75] Inventors: John P. Kitchen; Terry L. Gabhart, both of Georgetown, Ky.

[73] Assignee: Hoover Universal, Inc., Saline, Mich.

[21] Appl. No.: 940,433

[22] Filed: Sep. 7, 1978

[51] Int. Cl.² .................... A47C 19/00; B60B 33/00
[52] U.S. Cl. ................................. 5/310; 5/201; 16/43; 248/188.8
[58] Field of Search .............. 16/18, 30, 31, 43, 44; 5/176 R, 201, 310; 248/188, 188.8; 312/255, 256; 308/230

[56] References Cited

U.S. PATENT DOCUMENTS

| | | | |
|---|---|---|---|
| 973,514 | 10/1910 | Kenjon | 16/43 |
| 2,753,586 | 7/1956 | Metz | 16/43 |
| 2,992,449 | 7/1961 | Haydock | 16/43 |
| 3,100,304 | 8/1963 | Brandlin et al. | 5/176 R |
| 3,236,484 | 2/1966 | Hozeski | 248/188 |
| 3,828,376 | 8/1974 | Miller | 248/188.8 |
| 4,068,342 | 1/1978 | Carrier | 16/43 |

*Primary Examiner*—Casmir A. Nunberg
*Attorney, Agent, or Firm*—Olsen and Stephenson

[57] ABSTRACT

A leg assembly for a bed frame comprising a main body member having an upright passageway and a caster unit having a stem insertable into the passageway by moving it upwardly therein. Flexible tab members on the body member project into the passageway and into a recess formed in the stem when the stem is inserted into the passageway to a predetermined position to inhibit retraction of the stem from the passageway.

4 Claims, 6 Drawing Figures

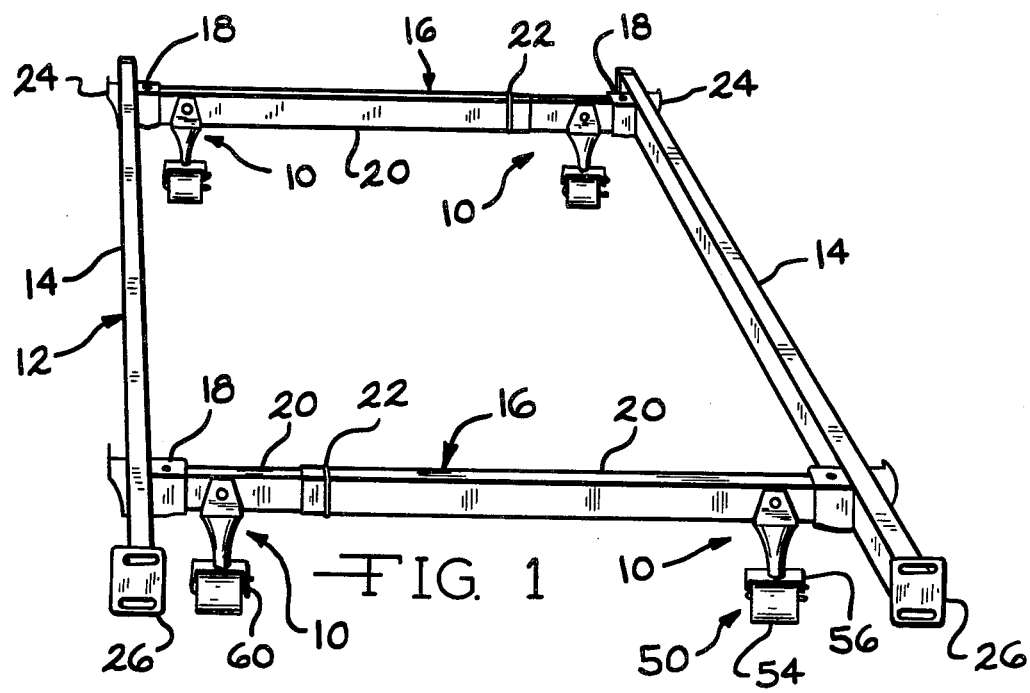
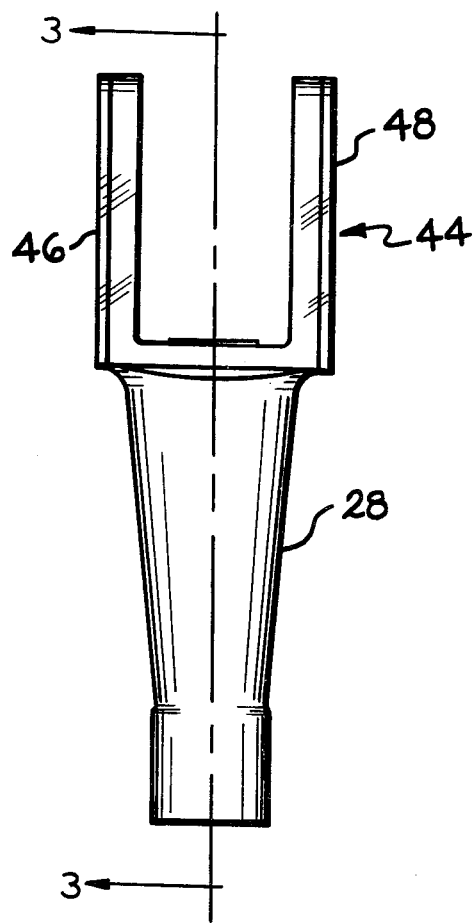
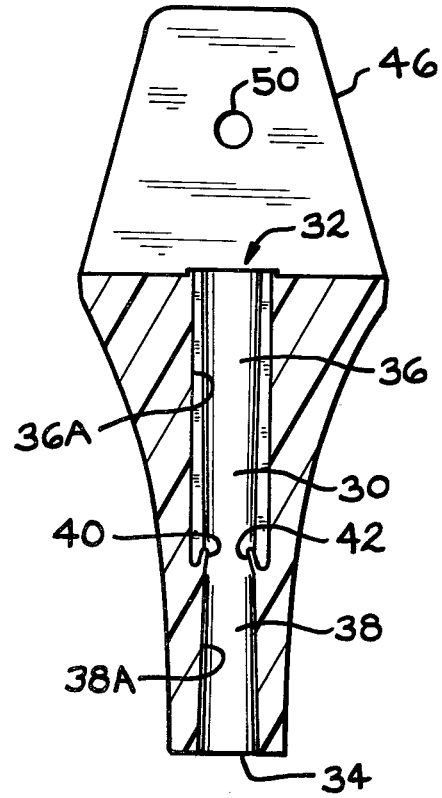

LEG ASSEMBLY FOR A BED FRAME

BACKGROUND OF THE INVENTION

The present invention relates to an improved leg assembly for furniture, expecially for a bed-carrying frame. Conventional leg assemblies can be costly to manufacture and may not perform as well as expected. Also, durability is another quality that is continually being strived for. It is the object of the present invention, therefore, to provide an improved furniture leg assembly.

SUMMARY OF THE INVENTION

In accordance with the present invention, an improved leg assembly is provided having a main body member with an upright passageway therein having a downward opening. The leg assembly also includes a caster unit having the usual roller and a support stem or spindle that is inserted into the main body member passageway by upwardly moving the stem therein to a predetermined position, usually a position where further upward movement is precluded.

Flexible tab means on the main body member extend radially inwardly to the passageway and project into a recess formed in the stem of the caster unit when the stem is in its predetermined position in the passageway. During the upward movement of the stem to the passageway, the stem engages and flexes the flexible tab means enabling the insertion of the stem to its predetermined position and when it is in that position, the tab means will resiliently snap back to their unflexed position and project into the recess.

Further objects, features, and advantages of the present invention will become apparent from a consideration of the following description when taken in connection with the appended claims and the accompanying drawing in which:

FIG. 1 is a perspective view of a bed-carrying frame having the leg assemblies of the present invention secured thereto;

FIG. 2 is an elevational view of the main body portion of the leg assembly of the present invention taken substantially from line 2—2 in FIG. 1;

FIG. 3 is an elevational sectional view of the leg assembly of the present invention taken substantially from line 3—3 in FIG. 2;

DETAILED DESCRIPTION OF THE PREFERRED EMBODIMENT

Figure 4:
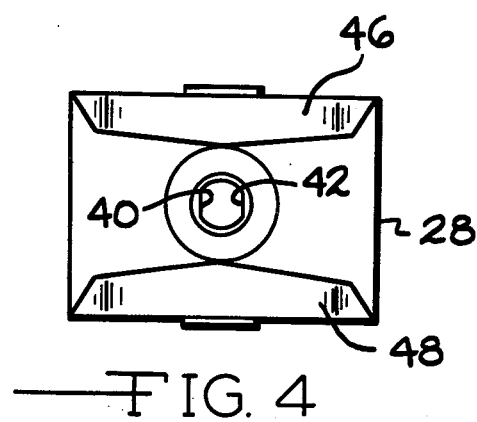
FIG. 4 is a plan view of the leg assembly of the present invention taken substantially from line 4—4 in FIG. 2.

Referring to the drawing, a plurality of leg assemblies of the present invention, indicated generally at 10, are shown in FIG. 1 secured to a bed-carrying frame 12. The frame 12 is disclosed in U.S. Pat. No. 4,070,717, issued to the assignee of of the present invention, and is incorporated herein by reference. Accordingly, a detailed description of the bed-carrying frame 12 will be made herein only to the extent necessary to describe the environment in which the present invention resides.

The bed-carrying frame 12 consists of a pair of parallel side rails 14, each of which is constructed having a hollow rectangular configutration and end rail units 16 hingedly secured to the side rails 14 by brackets 18. Each end rail unit consists of a pair of relatively telescoped end rail members 20 that are each constructed having a hollow rectangular configuration, of which one end rail member 20 is slightly larger than its mated end rail 20. Suitable lock means 22 fixes the end rail members 20 in a relatively fixed position that is determined by the width of the box spring assembly. Side retainers 24 are mounted on the side rails 14 and serve to prevent the box spring assembly (not shown) supported by the bed-carrying frame 12 from moving off the frame 12. Headboard mounts 26 are supported at one end of the rails 14 and support a headboard on the bed-carrying frame.

Figure 5:
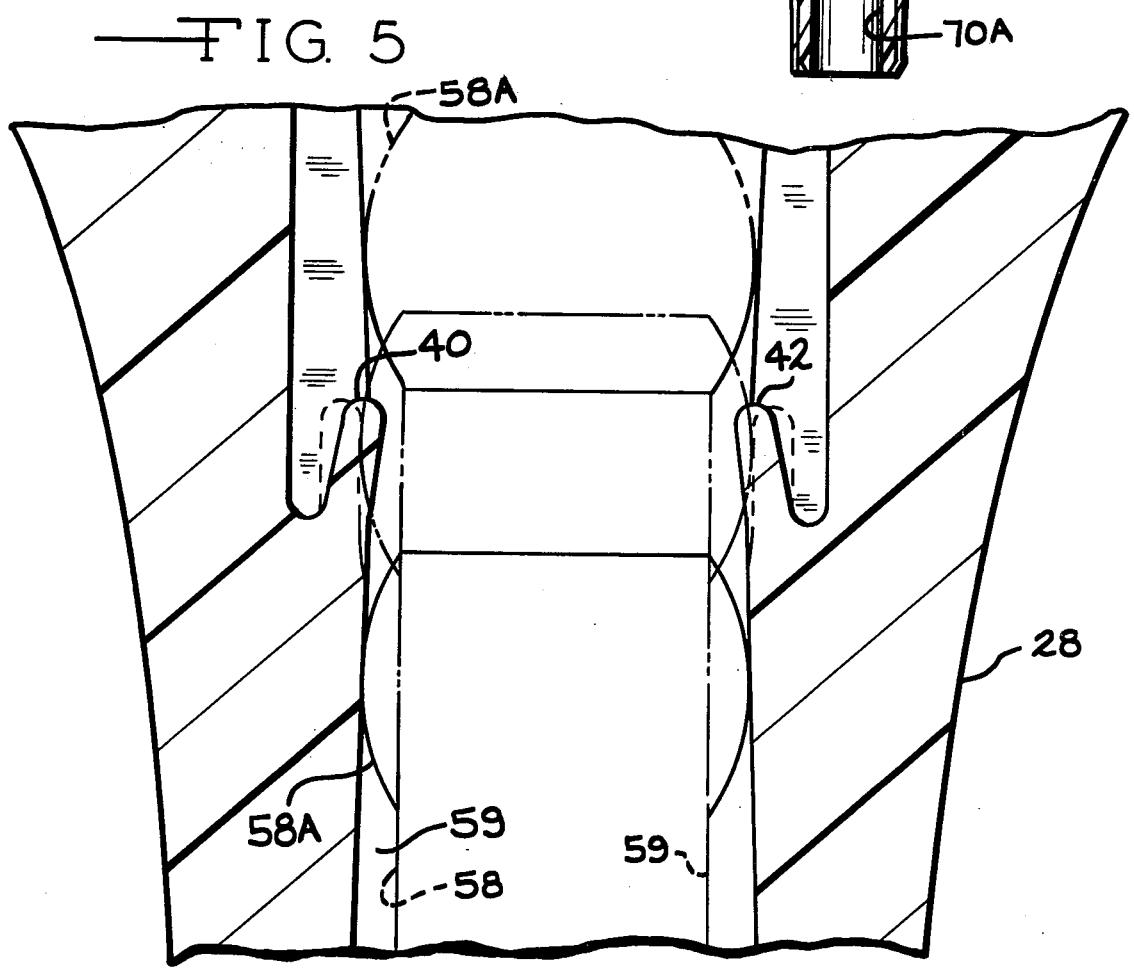
FIG. 5 is an enlarged fragmentary sectional view of the leg assembly of the present invention showing the stem portion of the caster unit inserted therein.

The leg assemblies 10 of the present invention are mounted on the end rail members 20 and when the bed-carrying frame 12 is assembled, the leg assemblies define four corners of a rectangle. As seen in FIGS. 2–5, each leg assembly 10 consists of a main body member 28 having an upright passageway 30 with upwardly and downwardly facing openings 32 and 34. The passageway 30 has an upper portion 36 and a lower portion 38. Inner walls 36A and 38A define the passageway portions 36 and 38. AS can be seen in FIG. 5, the walls 38A converge slightly in directions extending upwardly from the bottom opening 34. Flexible tab means in the form of a pair of generally-opposed flexible tab members 40 and 42 are formed on the body member 28 and extend generally radially inwardly and upwardly into the passageway 30. As shown in FIG. 3, the tab members 40 and 42 are intergral extensions of the walls 38A that define the lower passageway portion 38.

A trough-shape portion 44 consists of a pair of parallel plates 46 and 48 that extend upwardly from the main body member 28 and straddle an end rail member 20 to secure the leg assembly 10 to the bed-carrying frame 12. Suitable fasteners projects through openings 50 in the plates 44 and 46 to mount the leg assemblies 10 to the frame 12.

The leg assembly 10 further includes a caster unit 52, shown in FIG. 1, which consists of a roller member 54 rotatably mounted on a bracket 56 from which an upright stem 58 extends. A brake 60 is mounted on the bracket 56 and functions when actuated to a brake-applied position to restrain rotation of the roller member 54 on the bracket 56. As seen more clearly in Fig. 5, the stem portion 58 has a recess 59 extending downwardly from an enlarged top portion 58A. The stem 58 and the top portion have circular configurations enabling pivoting of the caster stem 58 about a vertical axis. In mounting the caster unit 52 onto the body member 28, the stem portion 58 is inserted upwardly through the bottom opening 34 in the passageway 30 to a predetermined position wherein the body member 28 can either rest on the racket 56 or on a suitable mounting portion that is disposed between the bracket 56 and the body member 28. When the stem 58 is inserted into the passageway 30, the top portion 58A engages and flexes the tab members 40 and 42 to more upright positions as is shown in the broken lines in FIG. 5 to enable the insertion of the stem 58 in its predetermined position. When the enlarged top portion 58A passes the tab members 40 and 42, they snap back to their relaxed position and project inwardly into the passageway 30 and into the recess 59 in the stem. The tab members 40 and 42 therefore inhibit the retraction of the stem 58 from the passageway 30. However, the tab members 40 and 42 still allow retraction of the stem 58 when a pulling force, such as a manual force for instance, is applied to the caster unit 52. the lower portion 38 has a smaller diameter than the upper portion 36 so that the walls 38A, or at least a portion thereof, extend into the recess 59 of the stem to restrict lateral displacement of the caster unit 52 during movement of the bed-carrying frame 12.

Figure 6:
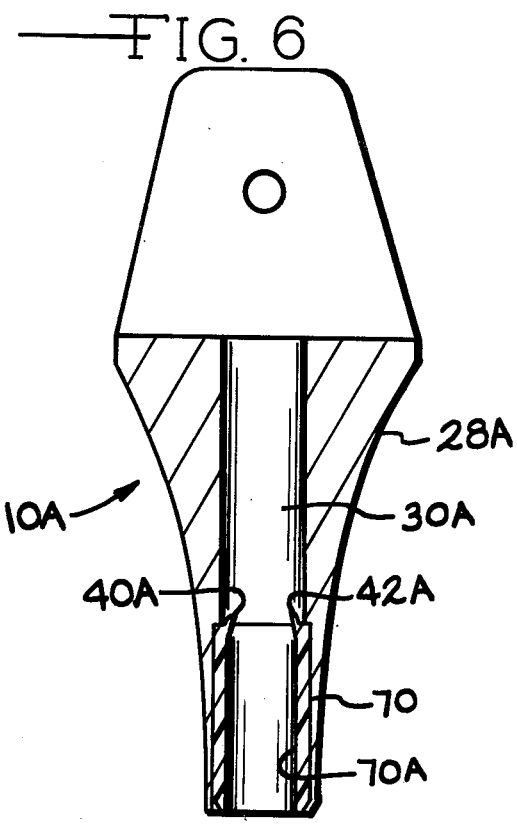
FIG. 6 is a fragmentary sectional view of a modified leg assembly of the present invention.

Another embodiment of the present invention is shown in FIG. 6. A leg assembly 10A, similar to the leg assembly 10, has a main body member 28A with an upright passageway 30A having top and bottom openings. A sleeve unit 70 is inserted into the passageway 30A and is maintained there in a suitable manner. The sleeve unit 70 carries flexible tab members 40A and 42A which function in the same manner as do the tab members 40 and 42 in the leg assembly 10. The sleeve unit 70 has an internal passageway 70A that is in general alignment with the passageway 30A. The passageway 30A and the passageway 70A in the sleeve 70 are in communication with each other so that the upward movement of the stem 58 of the caster unit 52 positions the stem 58 in its predetermined position where the tab members 40A and 42A project into the recess 59. As with the leg assembly 10, the sleeve passageway 70A has inner walls that converge in upward directions from the bottom opening of the passageway 70A. The converging walls close the clearence between the sleeve 70 and the caster stem 56 to stabilize the caster unit 52.

From the above description, it can be seen that improved leg assemblies 10 and 10A are provided having a unique positive caster retainer for inhibiting the retraction of the stem 58 of the caster unit 52 from the passageway. The leg assemblies 10 and 10A are durable in service and inexpensive to manufacture.

What is claimed:

1. A caster-supporting leg assembly comprising a body member, a longitudinal passageway extending axially into said body member from an opening therein, a plurality of flexible and resilient tab members in said passageway formed integral with said body member at opposed positions spaced inwardly from said opening, said tab members extending radially inwardly into said passageway and away from said opening in relaxed positions, said tab members being bendable radially outwardly from the passageway axis when a caster stem having a recess therein is inserted into said passageway, said tab members being returned to their relaxed positions in the caster stem recess to be in an interfering relationship with the caster stem to inhibit its withdrawal from said passageway.

2. The leg assembly according to claim 1 wherein said passageway converges in a direction extending inwardly from said opening.

3. The leg assembly according to claim 1 wherein said passageway is formed by a pair of adjacent portions with said tab members being positioned at the juncture of said passageway portions, one of said passageway portions being located between said opening and said juncture and the other of said portions extending away from said opening and said juncture, said other passageway portion having a larger cross section than said one portion.

4. A caster-supporting leg assembly comprising a caster unit including a caster stem having an enlarged top portion and having a recess therebelow, a body member, an upright passageway formed in said body member and extending upwardly from a downwardly facing opening in said body member, a plurality of flexible and resilient tab members in said passgeway formed integral with said body member at spaced apart positions located upwardly from said opening, said tab members extending radially inwardly and upwardly into said passageway in relaxed positions, said tab members being bendable to more upright positions when said enlarged top portion engages them as said caster stem is inserted into said passageway, said tab members resiliently returning to their relaxed positions in the caster stem recess when said top portion is positioned above said tab members to be in an interfering relationship with said top portion to inhibit the withdrawal of said caster stem from said passageway, said passageway comprising a lower portion extending upwardly from and an adjacent upper portion having a cross sectional area larger than the cross sectional area of said lower portion, said tab members being formed on the portions of said body member defining said lower passageway portion and extending upwardly into said upper pasageway portion, said lower passageway portion converging upwardly from said opening to restrict lateral movement of said caster stem in said passageway.

* * * * *